United States Patent [19]

Berry

[11] Patent Number: 5,072,446

[45] Date of Patent: Dec. 10, 1991

[54] PCM COMMUNICATION SYSTEM

[75] Inventor: Allan D. Berry, Coventry, United Kingdom

[73] Assignee: GEC Plessey Telecommunications Limited, England

[21] Appl. No.: 364,826

[22] Filed: Jun. 9, 1989

[30] Foreign Application Priority Data

Jun. 20, 1988 [GB] United Kingdom ................. 8814584

[51] Int. Cl.[5] .............................................. H04J 3/02
[52] U.S. Cl. ...................................... 370/112; 370/99
[58] Field of Search ...................... 370/56, 83, 99, 112, 370/53, 61, 77, 84

[56] References Cited

U.S. PATENT DOCUMENTS

| | | | |
|---|---|---|---|
| 3,995,119 | 11/1976 | Pachynski | 370/112 |
| 4,205,200 | 5/1980 | Parikh et al. | 370/83 |
| 4,486,880 | 12/1984 | Jeffery et al. | 370/112 |
| 4,593,390 | 6/1986 | Hildebrand | 370/112 |
| 4,685,101 | 8/1987 | Segal | 370/112 |
| 4,817,090 | 3/1989 | Pfennings | 370/112 |
| 4,881,224 | 11/1989 | Bains | 370/84 |
| 4,924,459 | 4/1990 | Angell et al. | 370/84 |

Primary Examiner—Douglas W. Olms
Assistant Examiner—Dang Ton
Attorney, Agent, or Firm—Kirschstein, Ottinger, Israel & Schiffmiller

[57] ABSTRACT

A digital communication apparatus interleaves multiple bit sequences of a predetermined length from a plurality of input signals all at one rate to a single output data stream at a higher rate. Normally the multiple bit sequences will be bytes. The apparatus comprises for each input signal (IN1-In4a first array (10-13) of storage circuits for storing sequentially in series each multiple bit sequence of predetermined length, the first arrays (10-13) being arranged in parallel, a reader for reading in parallel each of the stored bit sequences in the first arrays into second arrays (90-93) of storage circuits so that the bits of the stored sequences are interleaved, and a combiner (20) for combining the sequences output from the second arrays in such a manner that the output data stream contains the original multiple bit sequences interleaved so that in the final output stream a multiple bit sequence from one input signal is separated from the next multiple bit sequence of that signal by multiple bit sequences from each of the other input signals.

4 Claims, 5 Drawing Sheets

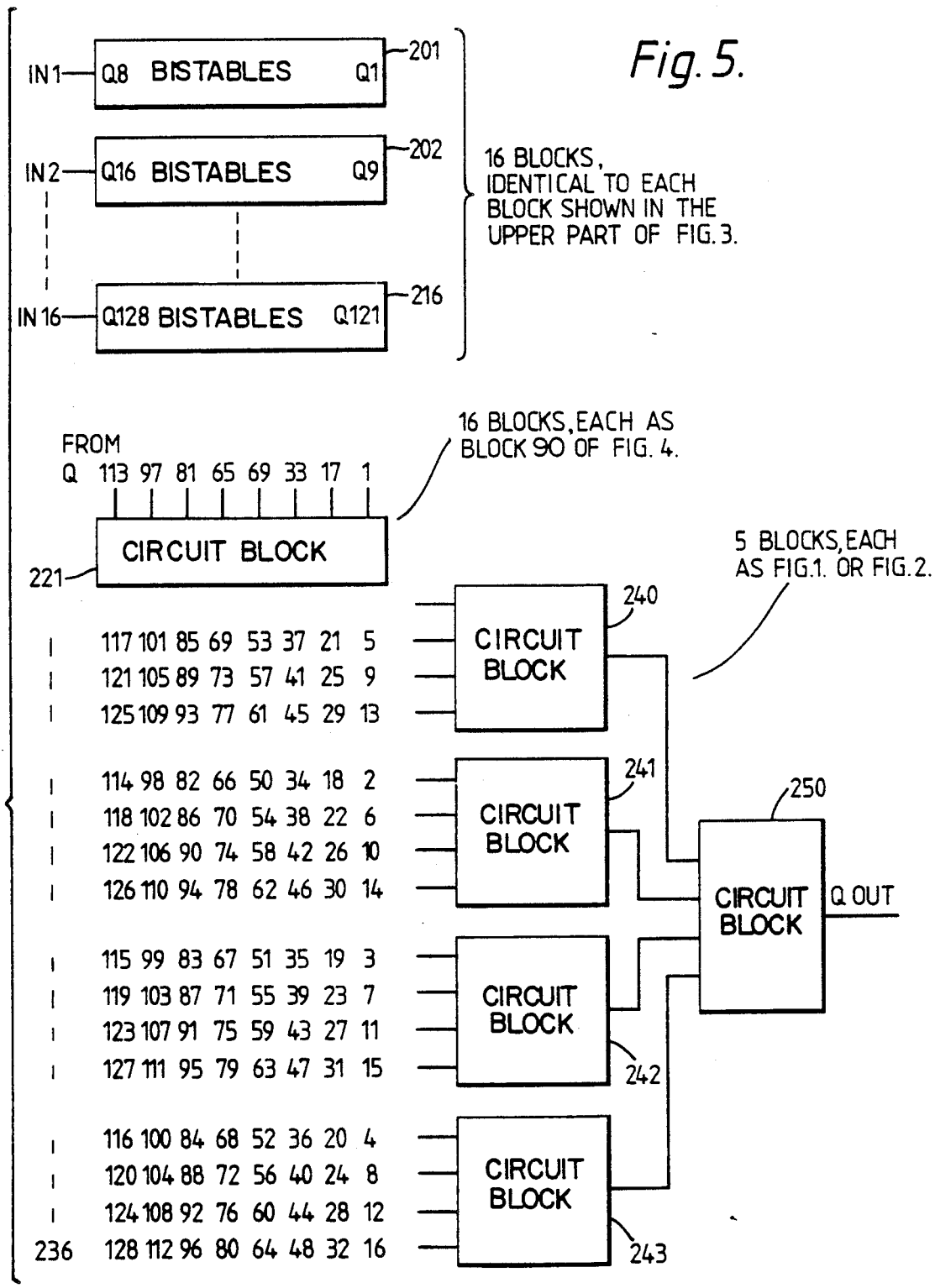

PCM COMMUNICATION SYSTEM

BACKGROUND OF THE INVENTION

1. Field of the Invention

The present invention concerns digital data transmission systems.

2. Description of Related Art

In the realm of digital communications, the use of binary digits, commonly known as "bits", where each symbol is allowed to take one of only two values, is widespread. For certain applications, sets of eight bits are grouped together as a "byte".

In order to transmit several identical channels over a single, higher rate, bearer, it is also common practice to "bit interleave" the bits from each channel, although recently some national and international standards have suggested that byte interleaving" should be used. In this case, the high rate bearer carries 8 consecutive bits from the first input channel, followed by 8 consecutive bits from the second, and so on. It is axiomatic that byte interleaving uses eight times as much storage (for example, D-type bistables or flip-flops) as does bit interleaving for the same type of basic processing.

SUMMARY OF THE INVENTION

The present invention is concerned with reducing the amount of processing which has to be performed at the higher rate in order to achieve byte interleaving.

Accordingly the present invention consists in digital communication apparatus for interleaving multiple bit sequences of a predetermined length from a plurality of input signals all at one rate to a single output data stream at a higher rate, the apparatus comprising for each input signal a first array of means for storing sequentially in series each multiple bit sequence of predetermined length, said arrays being arranged in parallel, means for reading in parallel each of said stored bit sequences in said arrays into second arrays of storage means so that the bits of said stored sequences are interleaved, and means for combining the sequences output from said second arrays in such a manner that the output data stream contains said original multiple bit sequences interleaved so that in the final output stream a multiple bit sequence from one input signal is separated from the next multiple bit sequence of that signal by multiple bit sequences from each of the other input signals.

BRIEF DESCRIPTION OF THE DRAWINGS

In order that the invention may be more clearly understood an embodiment thereof will now be described by way of example and with reference to the accompanying drawings, in which:

FIG. 5 is a block diagram of a modification of the embodiment of FIG. 4.

DETAILED DESCRIPTION OF THE PREFERRED EMBODIMENTS

Figure 1:
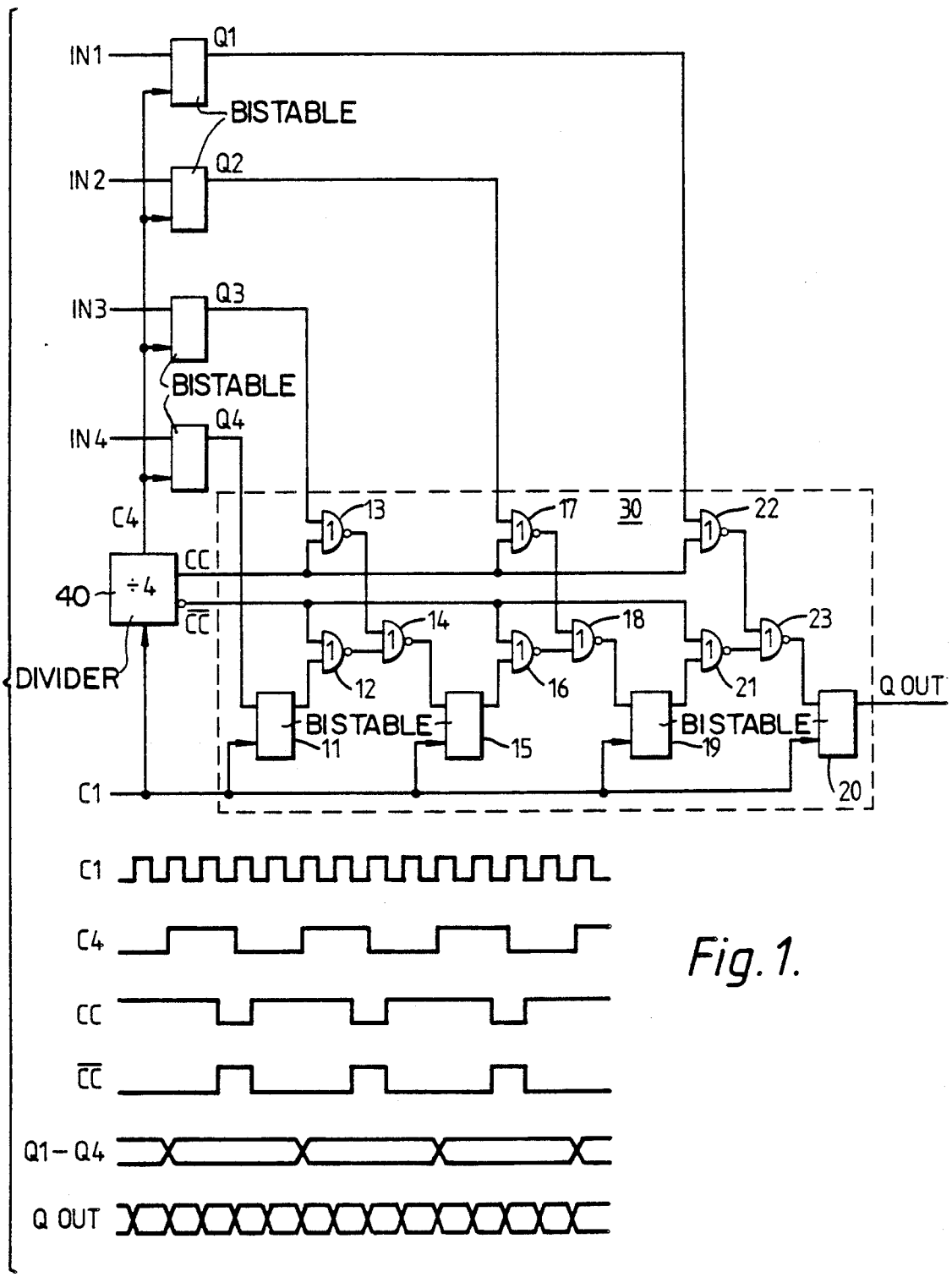
FIGS. 1 and 2 are block diagrams illustrating two known methods of bit interleaving according to the Prior Art.
Figure 2:
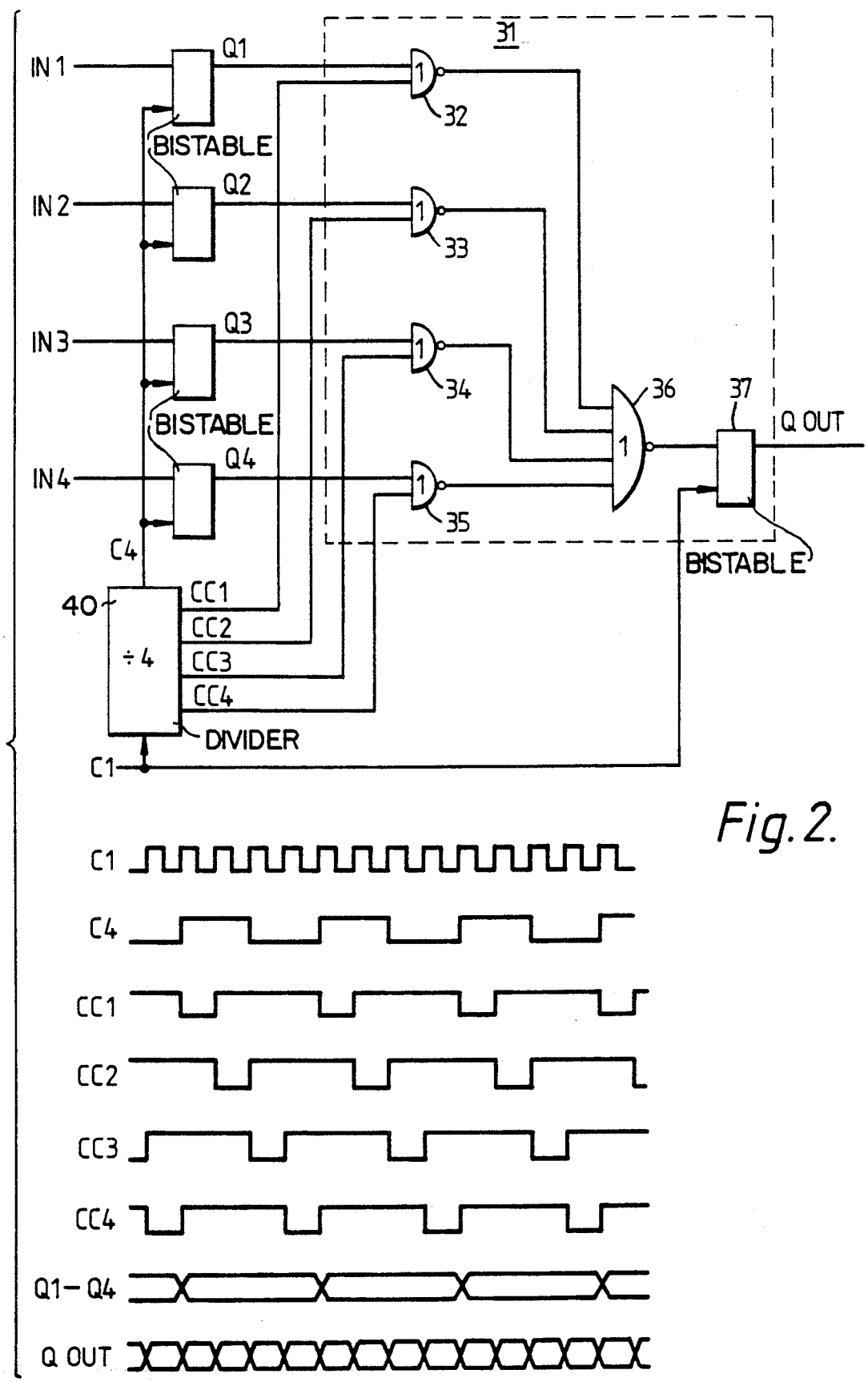

FIGS. 1 and 2 show two known methods for bit interleaving.

In FIG. 1 four input streams IN1 to IN4 are to be bit interleaved. Each stream is supplied to one input of an individual D-type bistable Q1 to Q4. The term "bistable" used herein is synonymous with the term "flip-flop". The other inputs of the bistables are supplied with a clock signal C4 derived from a main clock C1 by a divide-by-4 circuit 40. Signal C1 is at the output bit rate. Circuit 40 also provides a signal cc and its inverse $\overline{cc}$ which appear at the trailing edge of the pulses of C4. The outputs of bistables Q1–Q4 are taken to an array 30 of NOR-Gates and serially connected bistables.

Thus the output of bistable Q4 is taken to one input of a similar bistable 11 which is clocked with signal C1. The output of bistable 11 is taken to one input of a NOR-Gate 12 the other input of which is connected to signal $\overline{cc}$. The output of bistable Q3 is taken to one input of a NOR-Gate 13 the other input of which is connected to signal cc and the outputs of gates 12 and 13 taken to a NOR-gate 14 the output of which goes to one input of a bistable 15 clocked, like bistable 11, by signal C1. The output of bistable Q2 is combined with the output of bistable 15 in the same way as the outputs of bistables Q4 and 11, that is they are applied to respective NOR-Gates 17, 16 clocked by signals cc and $\overline{cc}$ and the outputs of which are taken to another NOR-Gate 18 providing an input to a bistable 19 clocked by signal C1. The final bit interleaved output signal is output by a bistable 20 also clocked by C1 and coupled to the outputs of bistables Q1 and 19 by NOR-Gates 21, 22, 23 all of which function in a manner similar to that of the previous two sets of NOR-Gates. This may be summarized as parallel loading when cc is low, and serial shift when $\overline{cc}$ is low.

In the embodiment of FIG. 2 the outputs of the four bistables Q1 to Q4 are taken to an array 31 of respective NOR-Gates 32, 33, 34, 35, the NOR-Gates being supplied with signals CC1, CC2, CC3 and CC4 from the divide-by-4 circuit 40.

These four signals are at the input bit rate and are successively one bit out of phase with respect to each other. The outputs of the four NOR-Gates are taken to a four input NOR-Gate 36 the output of which is taken to a bistable 37 clocked by signal C1.

The method of FIG. 2 has the advantage over that of FIG. 1 of using less bistables, but the disadvantage of using a 4 input gate. In the general case of N inputs, it would use an N input gate if this scheme were followed exactly, but variations are possible to reduce the number of inputs per gate at the expense of using more gates and more bistables. The timing diagrams appended to FIGS. 1 and 2 show only nominal times for illustrative purposes.

Figure 3:
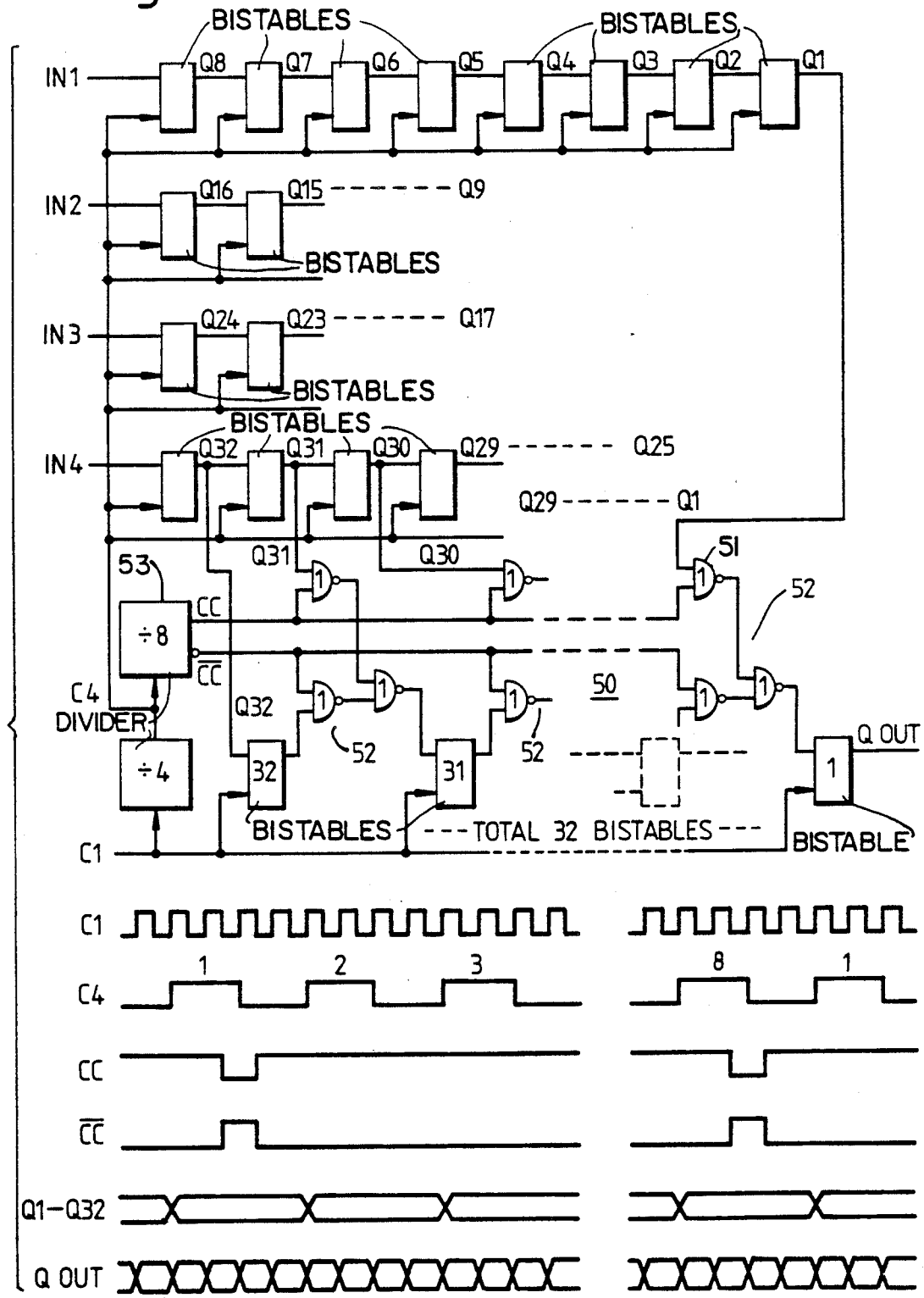
FIG. 3 is a block diagram of a known method of byte interleaving according to the Prior Art.

FIG. 3 shows a known method for byte interleaving, using principles similar to those of FIG. 1; it has been assumed that the input streams IN1-IN4 are already byte synchronizing, and that there is a means of synchronizing the divide-by-8 circuit to the byte timing. In all cases the methods are shown with 4 input channels as an example.

In the embodiment of FIG. 3 the single D-type bistables Q1 to Q4 are replaced by four arrays or banks of serially linked bistables, these being Q1 to Q8 for input IN1, Q9 to Q16 for input IN2 and so on. All these bistables are clocked by signal C4. Thus when a complete byte has been received from each input the first bit of the IN1 signal will be stored at Q1, the second at Q2 and so on. Similarly for IN2 the first bit will be at Q9, the second at Q10 and so on.

In order to simplify the drawing additional circuit elements associated with the arrays of bistables are only shown with respect to the IN4 signal paths. These additional elements consist of an array 50 of 32 D-type bistables all having their clock inputs connected to the C1 clock signal. Furthermore the output of each of the bistables in the four originally described arrays are each connected to the input of an individual NOR-Gate 51 save for the output of bistable Q32 which is connected directly to the input of the 32nd bistable in array 50.

Each bistable in array 50 is, apart from the output bistable, associated with three NOR-Gates in a manner totally analagous to the NOR-Gates shown in FIG. 1. The NOR-Gates are indicated at 52 and the first pair of NOR-Gates in each set of three are respectively connected to signals cc and its inverse $\overline{cc}$ generated by a divide-by-8 circuit 53 operating on signal C4.

A method for byte interleaving, using principles similar to those of FIG. 2 is obvious, but is not given in detail here.

The practical realization of logic processing circuits involves the correct tolerancing of the timing delays of the various logic elements, including allowance for the set-up and hold times of the D-type bistables. In particular, the tolerancing of all the foregoing circuits requires that the permitted delays of all the elements shown in the FIGS. 1–3 are related to the output symbol rate, that is, to the shortest repetition period.

Figure 4:
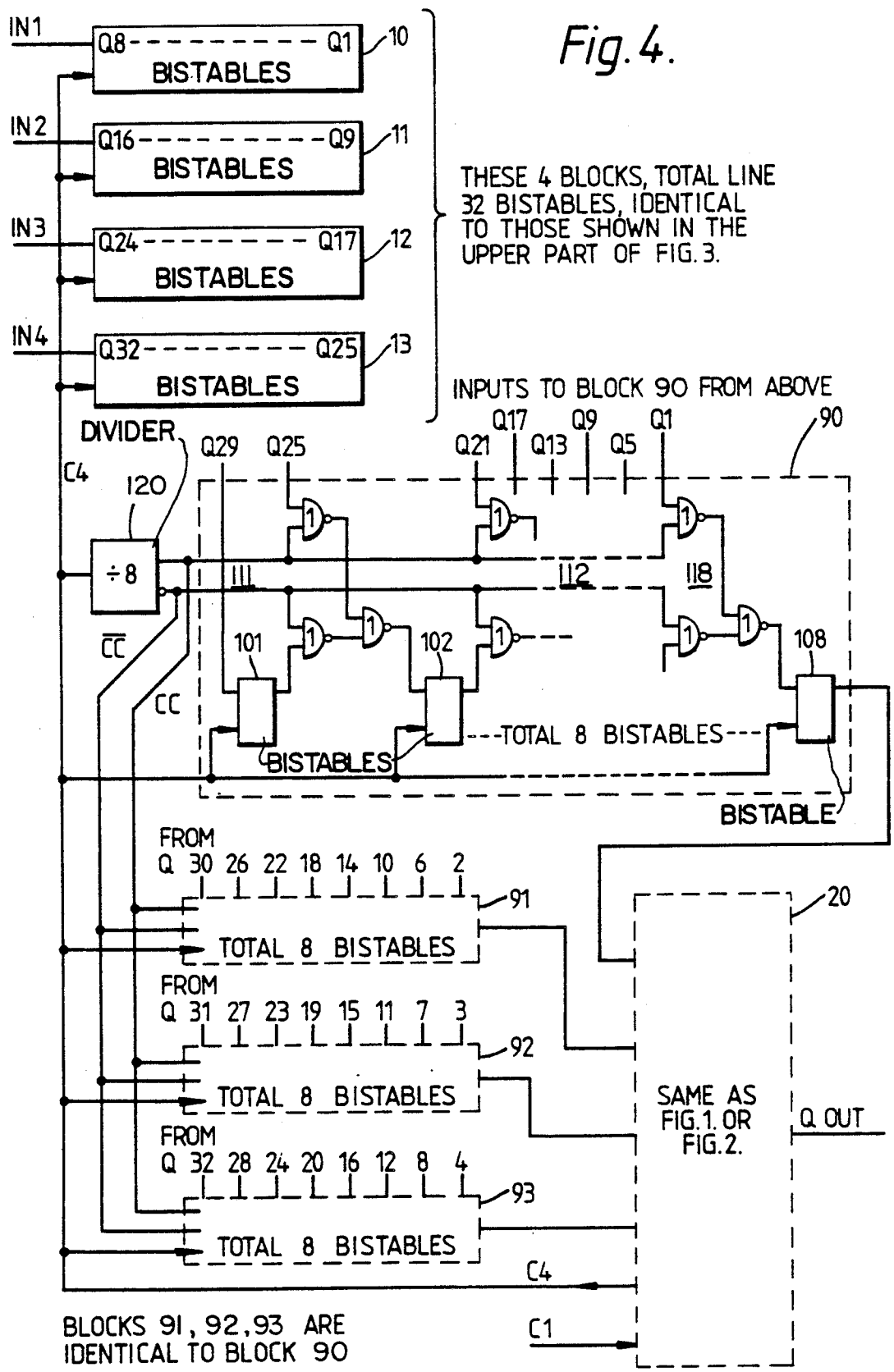
FIG. 4 is a block diagram of one embodiment of apparatus according to the present invention for byte interleaving.

In the case of byte interleaving, it would be an obvious advantage if the amount of processing which has to be performed to meet this criterion could be reduced. FIG. 4 shows the principle used to achieve this, namely that the bits of the input channels are interchanged, using logic processes whose timing tolerances are related only to the input rate, before being finally bit interleaved using simple circuitry like that of FIG. 1 or 2. The stages in the byte stores have been numbered in reverse order, to illustrate the sequence of the bits in each input channel and in the output channel.

As can be seen in FIG. 4 each of the input signals IN1–IN4 is fed into a respective array or block of 8 D-type bistables, the arrays being numbered 10, 11, 12 and 13. Each array then stores a byte with the first bit loaded of channel IN1 indicated at Q1, the second bit of IN1 at Q2 and so on. Similarly the first bit of IN2 is indicated at Q9. Each of these arrays is identical to the array Q1 to Q8 shown in FIG. 3. However in this embodiment the contents of blocks 10–13 are fed in parallel into four additional circuit arrays or blocks 90–93. Only block 90 is shown in detail as blocks 91, 92 and 93 are identical to it. Block 90 consists of an array of 8 D-type bistables 101, 102, ... 108 (only three are shown). The block also includes seven sets of NOR-Gates 111 to 118, each set consisting of three NOR-Gates connected in exactly the same manner as the NOR-Gates and bistables in FIGS. 1 and 3, the first pair of NOR-Gates in each set being respectively supplied with a signal cc and its inverse $\overline{cc}$ taken from a divide-by-8 counter 120. As is shown in FIG. 4 the first NOR-Gate of set 118 receives the output of bistable Q1, the first NOR-Gate of Set 112 the output of bistable Q21 and so on till the first NOR-Gate of set 111 receives the output of bistable Q29 of array 13. All these first NOR-Gates receive signal cc at their other input. The second NOR-Gate of each set receives signal $\overline{cc}$ at one input and the output of the preceding bistable in the block.

The result of this operation is that block 90 holds the 8 bits Q1, Q5, Q9, Q13, Q17, Q21, Q25 and Q29, block 91 the bits Q2, Q6 etc. The bits from the four input channels have thus been interleaved in a particular order. The contents of the four blocks 90–93 are then read out and interleaved by a circuit 20 identical to either of the entire circuits shown in FIGS. 1 or 2. It will be seen that the interleaving of the bits in the four blocks followed by the interleaving of the outputs of the blocks effectively byte interleaves the four input data channels.

As a further but not exclusive example of this principle, FIG. 5 shows the bit interchange method which may be used in order to achieve effective byte interleaving for 16 input channels, using bit interleaving in two stages to achieve the final rate.

The embodiment illustrated in FIG. 5 has 16 arrays 201–216 each associated with a single incoming signal IN1–IN16. Each of these arrays is identical to the array of 8 serial-connected bistables Q1 to Q8 shown in FIG. 3 and to the arrays 10 to 13 shown in FIG. 4. The parallel outputs of these blocks 101–116 are taken to 16 arrays 221–236 each identical to the blocks 90–93 shown in FIG. 4. The manner in which the incoming bits are arranged in these arrays 221–236 is shown by the number grids.

The serial output of the last bistable in each array 221–236 is taken to one of four arrays 240–243 each of which is effectively identical to either the entire circuit as shown in FIG. 1 or in FIG. 2.

The outputs of each of the arrays 240–243 are taken to a single array 250 which is identical to the array 240. As will be appreciated the successive bit interleaving of the input signals eventually results in the final output signal being byte interleaved.

The foregoing description has been concerned with the interleaving bytes of incoming signals. It will be appreciated that the basic principles of the apparatus described with reference to FIGS. 4 and 5 could be applied to multiple bit sequences of lengths other than 8.

I claim:

1. Digital communication apparatus for interleaving multiple bit sequences of a predetermined length from a plurality of input signals, each carrying multiple-bit, sequence-oriented data, all at one rate, to a single output data system at a higher rate, the apparatus comprising: for each input signal, a first array of storage means for storing sequentially in series each multiple bit sequence of predetermined length, said first arrays being arranged in parallel, each said first array including a plurality of serially-connected flip-flops equal in number to the number of bits in each said bit sequence; means for reading in parallel each of said stored bit sequences in said first arrays into second arrays of storage means so that the bits of said stored sequences are interleaved, each said second array including a plurality of flip-flops connected in series by first sets of gates, the number of flip-flops in each said second array being equal to the number of bits in said bit sequence; and means for combining the sequences output from said second arrays in such a manner that the output data stream contains said multiple bit sequences input to said first arrays in parallel interleaved so that, in the single final output stream, a multiple bit sequence from one input signal is separated from the next multiple bit sequence of that signal by multiple bit sequences from each of the other input signals.

2. Apparatus as claimed in claim 1, wherein each said first set of gates comprises a pair of NOR-Gates, the outputs of which are taken to a third NOR-Gate, the output of which is connected to the input of the next succeeding flip-flop in said second array.

3. Apparatus as claimed in claim 2, wherein the pair of NOR-Gates of each set of gates receive, at respective inputs, outputs from flip-flops in different ones of said first arrays of storage means, and outputs from the last preceding flip-flop in said second array and timing signals, the timing signal received at one input of one of a pair of NOR-Gates being the inverse of the timing signal received by the other NOR-Gate of the pair.

4. Apparatus as claimed in claim 3, wherein the means for combining the output sequences of said second arrays comprises a plurality of flip-flops connected in series by a second set of gates, the number of flip-flops being equal to the number of said second arrays.

* * * * *